United States Patent
Acharya et al.

(10) Patent No.: US 7,065,253 B2
(45) Date of Patent: Jun. 20, 2006

(54) WAVELET ZEROTREE CODING OF ORDERED BITS

(75) Inventors: Tinku Acharya, Chandler, AZ (US); Niloy J. Mitra, West Bengal (IN); Prabir K. Biswas, Kharagpur (IN)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 09/390,255

(22) Filed: Sep. 3, 1999

(65) Prior Publication Data
US 2003/0108247 A1  Jun. 12, 2003

(51) Int. Cl.
*G06K 9/36* (2006.01)
(52) U.S. Cl. ........................ 382/240; 382/232
(58) Field of Classification Search ........... 382/232, 382/240, 238, 239, 248; 375/240.11, 240.19; 348/397.1, 398.1, 437.1, 438.1
See application file for complete search history.

(56) References Cited

U.S. PATENT DOCUMENTS

| 5,321,776 A | 6/1994 | Shapiro | 382/56 |
|---|---|---|---|
| 5,563,960 A | 10/1996 | Shapiro | 382/239 |
| 5,748,786 A | 5/1998 | Zandi et al. | 382/240 |
| 5,777,678 A | 7/1998 | Ogata et al. | 348/398 |
| 6,125,201 A | 9/2000 | Zador | 382/166 |
| 6,144,773 A * | 11/2000 | Kolarov et al. | 382/240 |
| 6,157,746 A | 12/2000 | Sodagar et al. | 382/240 |
| 6,222,941 B1 * | 4/2001 | Zandi et al. | 382/232 |
| 6,359,928 B1 | 3/2002 | Wang et al. | 375/240.05 |

FOREIGN PATENT DOCUMENTS

| EP | 0 892 557 A1 | 1/1999 |
|---|---|---|
| EP | 0 905 978 A2 | 3/1999 |
| EP | 0 920 213 A2 | 6/1999 |
| EP | 0 926 896 A2 | 6/1999 |
| WO | PCT/US02/16357 | 5/2002 |

* cited by examiner

*Primary Examiner*—Yon J. Couso
(74) *Attorney, Agent, or Firm*—Trop, Pruner & Hu, P.C.

(57) ABSTRACT

A computer system includes a memory and a processor. The memory stores a program to cause the processor to provide wavelet coefficients that indicate an image. The processor represent each wavelet coefficient as a collection of ordered bits, and the processor codes the bits of each order to indicate zerotree roots that are associated with the order.

18 Claims, 5 Drawing Sheets

D(1) ⟶ { $G_1(1), G_2(1), G_3(1), G_4(1)$ }

WAVELET ZEROTREE CODING OF ORDERED BITS

BACKGROUND

The invention generally relates to zerotree encoding of wavelet data, such as zerotree encoding of wavelet coefficients, for example.

Data compression typically removes redundant information from a set of data to produce another set of data having a smaller size. This smaller size may be beneficial, for example, for purposes of transmitting the data over a bus or network.

For example, the pixel intensities of an image may be indicated by a set of coefficients, and these coefficients may be represented by digital image data. For purposes of compressing the image data, the data may be transformed to reveal redundant information, i.e., information may be removed via data compression. For example, the image data may be transformed pursuant to a wavelet transformation, a transformation that effectively decomposes the image into spatially filtered images called frequency subbands. In this manner, the subbands may reveal a significant amount of redundant information that may be removed by compression techniques.

Referring to FIG. 1, as an example, image data that indicates pixel intensities of an image 12 may undergo wavelet transformations to decompose the image 12 into subbands. Due to the nature of the transformations, the subbands appear in different decomposition levels (levels 14, 16 and 18, as examples). In this manner, to decompose the original image 12 into subbands 14a, 14b, 14c and 14d of the first decomposition level 14, the one dimensional Discrete Wavelet Transform (DWT) is applied row-wise and then column-wise. In one dimensional DWT, the signal (say a row-wise) is first low-pass filtered and sub-sampled by dropping the alternate filtered output to produce the low-frequency subband (L) which is half the size of the original signal. Then the same signal is high-pass filtered and similarly sub-sampled to produce the high-frequency subband (H) which is half the size of the original signal. When the same one dimensional operation is applied column-wise on the L subband, it produces two subbands LL and LH. Similarly, applying the same one dimensional operation column-wise on the H subband, it produces two subbands HL and HH subbands. As a result after two-dimensional Discrete Wavelet Transform, the original image 12 is decomposed into four subbands: the LL subband 14a, the LH subband 14b, HL subband 14c and HH subband 14d. Sizes of the row and column of each of these subbands is half the sizes of the row and column of the original images due to the sub-sampling operation. The values of these subbands are called the wavelet coefficients and hence the subbands may be represented by an associated matrix of wavelet coefficients.

The LL subband 14a indicates low frequency information in both the horizontal and vertical directions of the image 12 and typically represents a considerable amount of information present in the image 12 because it is nothing but the sub-sampled version of the original image 12. The LH subband 14b indicates low frequency information in the horizontal direction and high frequency information in the vertical direction, i.e., horizontal edge information. The HL subband 14c indicates high frequency information in the horizontal direction and low frequency information in the vertical direction, i.e., vertical edge information. The HH subband 14b indicates high frequency information in the horizontal direction and high frequency information in the vertical direction, i.e., diagonal edge information.

Since LL subband 14a is nothing but the sub-sampled version of the original image, it maintains the spatial characteristics of the original image. As a result, the same DWT decomposition can be further applied to produce four subbands that have half the resolution of the LL subband 14a in both the vertical and horizontal directions: the LL subband 16a, LH subband 16b, HL subband 16c and HH subband 16d. Hence the LL subband 16a is again the sub-sampled version of the LL subband 14a. Hence LL subband 16a can be further decomposed to four subbands that have half of its resolution in both horizontal and vertical directions: LL subband 18a, LH subband 18b, HL subband 18c and HH subband 18d.

The subbands of the lower decomposition levels indicate the information that is present in the original image 12 in finer detail (i.e., the subbands indicate a higher resolution version of the image 12) than the corresponding subbands of the higher decomposition levels. For example, the HH subband 18d (the parent of the HH subband 16d) indicates the information that is present in the original image 12 in coarser detail than the HH subband 16d (the child of the HH subband 18d), and the HH subband image 14d (another descendant of the HH subband 18d) indicates the information that is present in the original image 12 in finer detail than the HH 16d and 18d subbands. In this manner, a pixel location 24 of the HH subband image 18d corresponds to four pixel locations 22 of the HH subband 16d and sixteen pixel locations 20 of the HH subband 14d.

Due to the relationship of the pixel locations between the parent subband and its descendants, a technique called zerotree coding may be used to identify wavelet coefficients called zerotree roots. In general, a zerotree root is a wavelet coefficient that satisfies two properties: the coefficient has an insignificant intensity, and all of the descendants of the coefficient have insignificant intensities with respect to a certain threshold. Thus, due to this relationship, a chain of insignificant coefficients may be indicated by a single code, a technique that compresses the size of the data that indicates the original image. As an example, if the wavelet coefficient for the location 24 is a zerotree root, then the wavelet coefficients for the locations 20, 22 and 24 are insignificant and may be denoted by a single code.

The coding of each decomposition level typically includes two passes: a dominant pass to determine a dominant list of wavelet coefficients that have not been evaluated for significance and a subordinate pass to determine a subordinate list of wavelet coefficients that have been determined to be significant. During the subordinate pass, a threshold may be calculated for each subband and used to evaluate whether coefficients of the subband are insignificant or significant. Unfortunately, due to the computational complexity, the above-described compression technique may be too slow for some applications, such as an interactive video compression application, for example.

Thus, there is a continuing need for an arrangement that addresses one or more of the above-stated problems.

SUMMARY

In one embodiment, a method includes providing wavelet coefficients that indicate an image and representing each wavelet coefficient as a collection of ordered bits. The bits of each order are coded to indicate zerotree roots that are associated with the order.

Advantages and other features of the invention will become apparent from the following description, drawing and claims.

DETAILED DESCRIPTION

Figure 1:
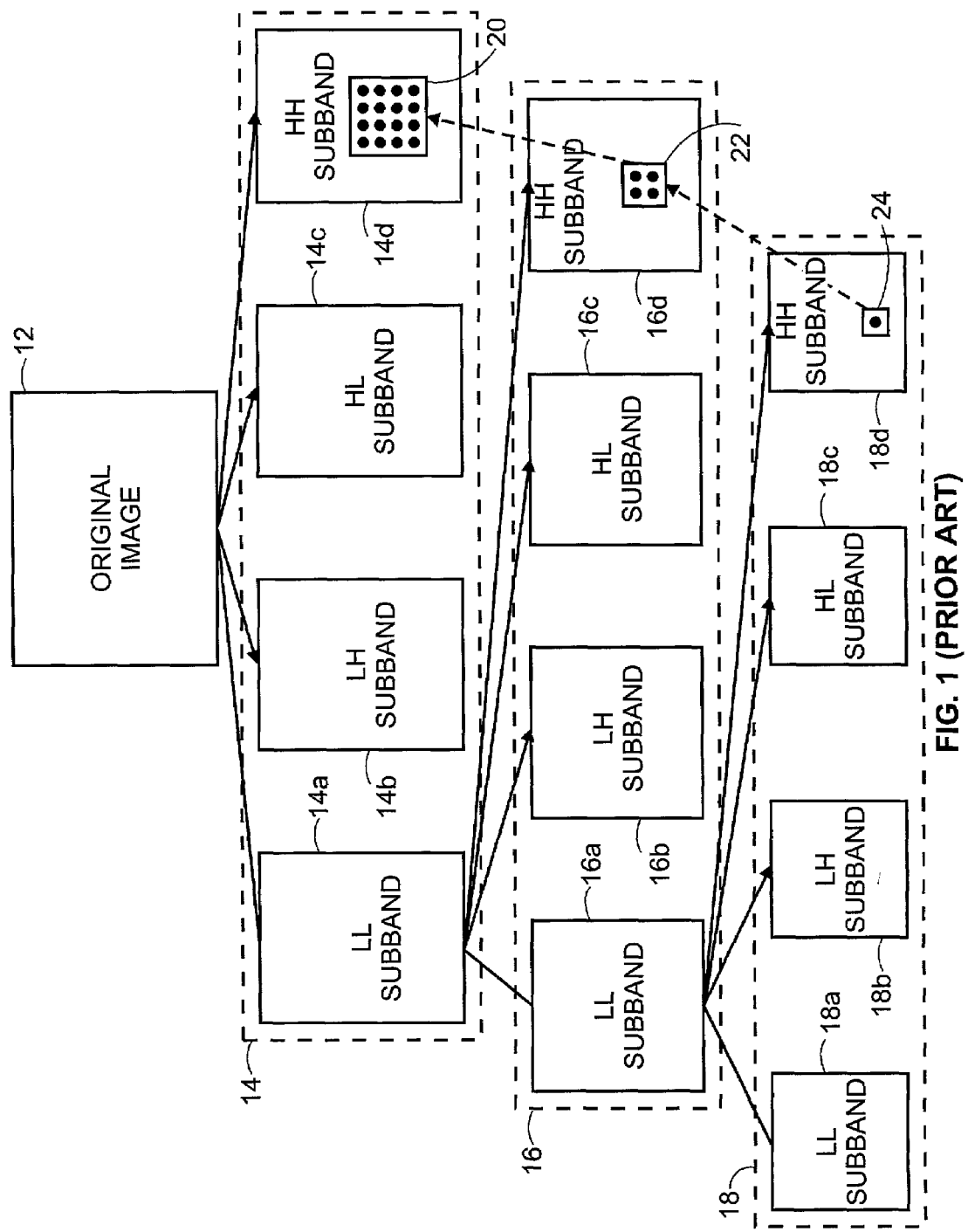
FIG. 1 is an illustration of the hierarchical order of subbands produced by wavelet transformations.
Figure 2:
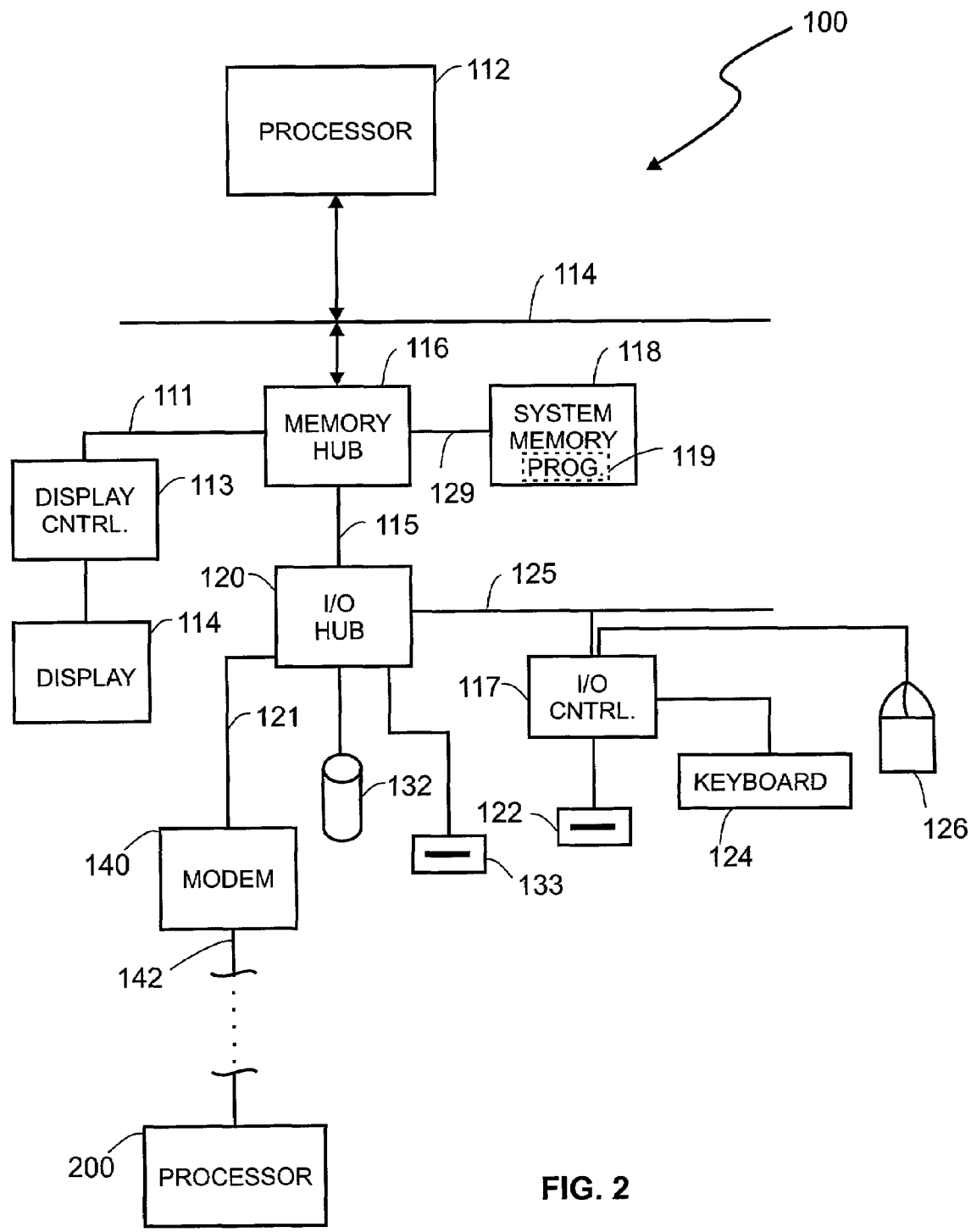
FIG. 2 is a schematic diagram of a computer system according to an embodiment of the invention.

Referring to FIG. 2, an embodiment 119 of a compression program in accordance with the invention may cause a processor 112 to encode wavelet coefficients in a bit-wise fashion. In this manner, instead of classifying the wavelet coefficients (as zerotree roots or isolated zeros, as examples), the processor 112 may produce codes to classify the bits of the wavelet coefficients. For example, in some embodiments, the processor 112 may classify a particular bit as being either a zerotree root, an isolated zero, a positive node or a negative node. Unlike conventional zerotree coding schemes, thresholds are not computed to identify insignificant values, as the "0" bit is treated as being insignificant and the "−1" and "1" bits are treated as being significant.

In this manner, the processor 112 may generate one of the following codes to classify a particular bit: a "P" code to indicate a positive node if the bit indicates a "1"; an "N" code to indicate a negative node if the bit indicates a "−1"; an "R" code to indicate that a "0" bit is a zerotree root; and an "IZ" code to indicate that a "0" bit is an isolated zero. In some embodiments, a particular bit is classified as a negative node only if the bit is the most significant nonzero bit and the bit indicates a "−1." For example, for a coefficient of "−3" that is represented by the three bits "−011," the processor 112 generates an N code to represent the middle bit. However, for this example, the processor 112 generates a P code to represent the least significant bit.

For purposes of providing the wavelet coefficients, the processor 112 may, via wavelet transformations, decompose coefficients that represent pixel intensities of an original image. These wavelet coefficients, in turn, form subbands that are located in multiple decomposition levels. To classify the bits, the processor 112, in some embodiments, may execute the program 119 to process the bits based on their associated bit position, or order. In this manner, the bits of each bit order form a hierarchical tree that the processor 112 may traverse to classify each of the bits of the tree as being either a zerotree root, an isolated zero, a negative node or a positive node. Thus, as an example, the most significant bits of the wavelet coefficients(this bit may also be zero) are associated with one hierarchical tree (and one bit order), and the next most significant bits are associated with another hierarchical tree (and another bit order).

For example, if the absolute maximum wavelet coefficient is represented by three bits (as an example), then all of the wavelet coefficients may be represented by three bits. Therefore, for this example, three hierarchical trees are formed. In this manner, the processor 112 produces a code for each bit based on its indicated value (i.e., "−1," "0," or "1") and possibly (if the bit indicates a "0") its position in the associated hierarchical tree.

In some embodiments, the processor 112 indicates the P, N, IZ and R codes via a bit stream that progressively indicates a more refined (i.e., a higher resolution) version of the original image over time. For example, the processor 112 may use the bits "00" to indicate the "P" code, the bits "01" to indicate the "N" code, the bits "10" to indicate the "R" code and the bits "11" to indicate the IZ code. Other coding schemes are possible. The progressive nature of the bit stream is attributable to the order in which the processor 112 processes the bit orders. For example, in some embodiments, the processor 112 may process the bit orders in a most significant first fashion. Therefore, the processor 112 may initially produce code all the bits that have the highest bit order, then produce code for all of the bits that have the next highest bit order, etc. As a result of this progressing coding, the resultant bit stream may initially indicate a coarser version of the original image. However, more refinements to the image are indicated by the bit stream over time, as the processor 112 produces the codes for the bits having the lower bit orders. Thus, in some embodiments, the resolution of the image that is indicated by the bit stream improves over time, a feature that may be desirable for bandwidth-limited systems. As a result, a decrease in resolution of the reconstructed image may be traded for a decrease in communication bandwidth.

Figure 3:
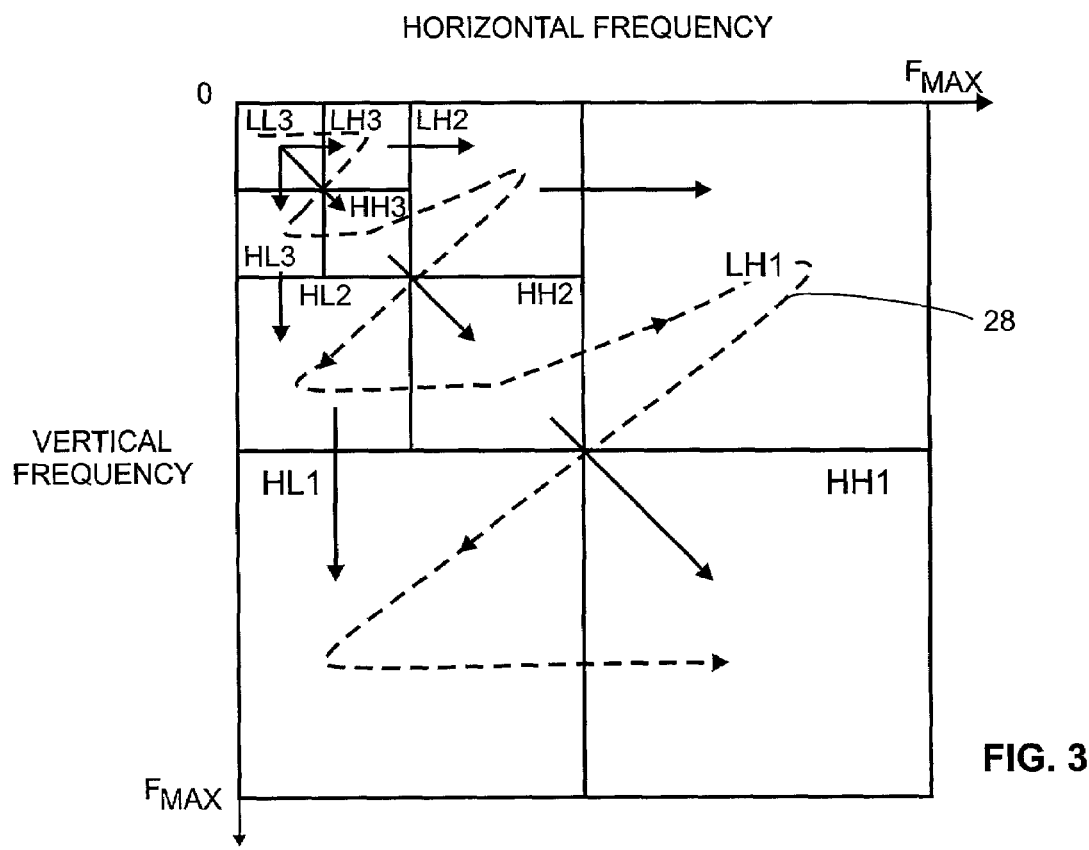
FIG. 3 is an illustration of a scanning path to determine zerotree roots according to an embodiment of the invention.

Referring to FIG. 3, in some embodiments, the processor 112 process the bits of each order in a predefined sequence. For example, for a particular bit order, the processor 112 may begin with the highest decomposition level and produce codes for the bits of the highest decomposition level before proceeding to produce codes for the bits of the next highest decomposition level. The processor 112 produces code(s) for the bit(s) of the LL subband and, then for each decomposition level, produces code(s) for the bit(s) of the LH subband, subsequently, produces code(s) for the bit(s) of the HL subband and lastly, produces code(s) the bit(s) of the HH subband.

Figure 4:
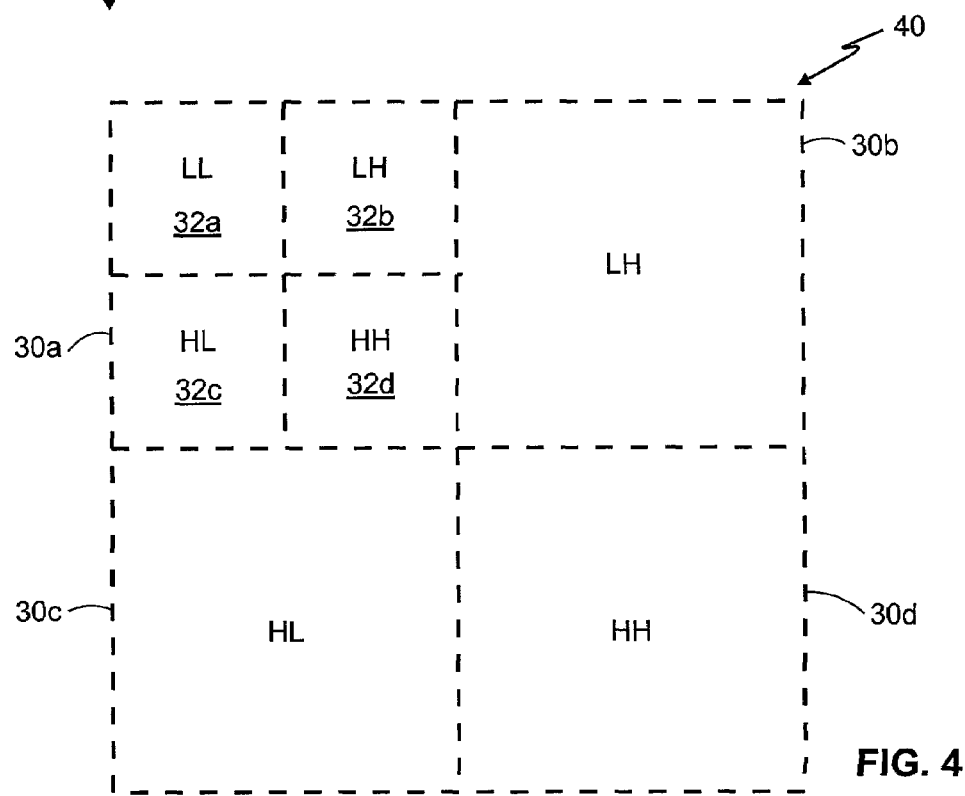
FIG. 4 is an illustration of the organization of a wavelet coefficient matrix according to an embodiment of the invention.

As an example, the wavelet coefficients produced by a two level decomposition may be arranged in a matrix 40 that is depicted in FIG. 4. In this manner, the matrix 40 may be viewed as being subdivided into four quadrants 30a, 30b, 30c and 30d. The upper right 30b, lower left 30c and lower right 30d quadrants includes the coefficients for the LH, HL and HH subband images, respectively, of the first decomposition level. The coefficients for the LL, LH, HL and HH subband images of the second decomposition level are located in the upper left 32a, upper right 32b, lower left 32c and lower right 32d quadrants of the upper left quadrant 30a. The coefficients produced by further decomposition may be arranged in a similar manner. For example, for a third level of decomposition, the upper left quadrant 32a includes the wavelet coefficients of the LL, LH, HL and HH subbands of the third decomposition level.

Figures 5, 6:
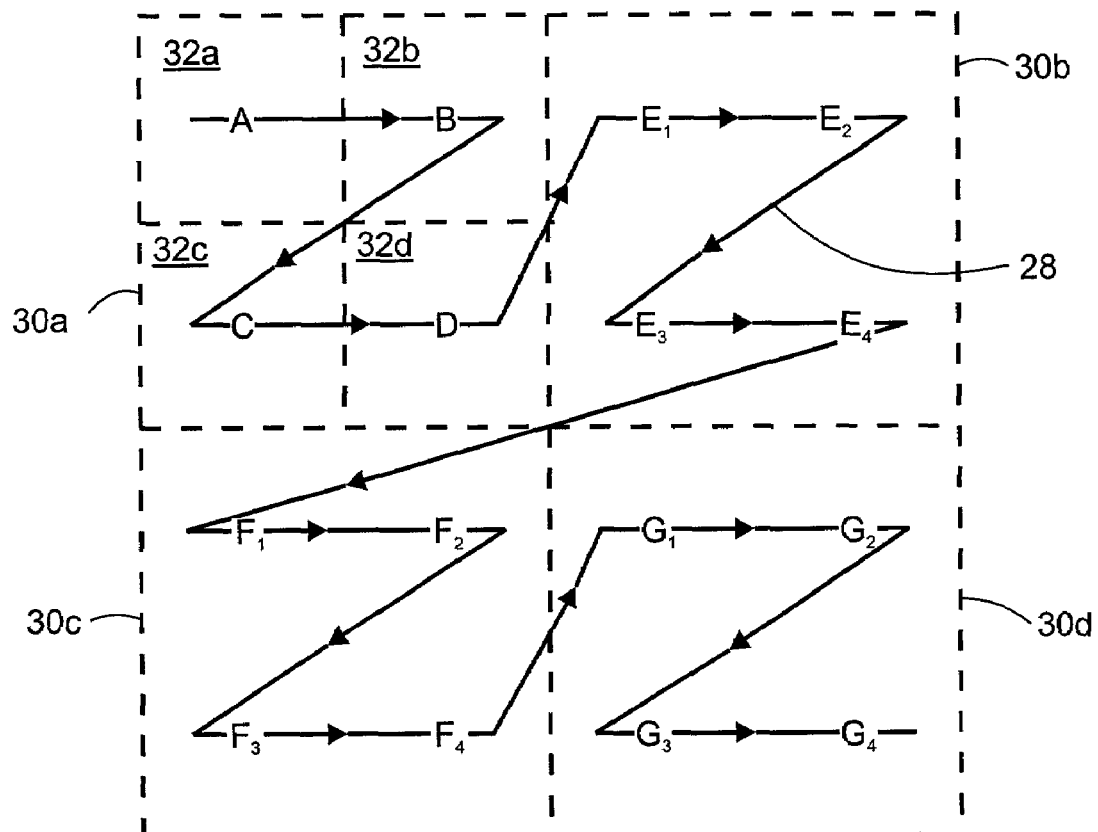
FIG. 5 is an illustration of a scanning path for a wavelet coefficient matrix.
FIG. 6 is an illustration of a path that is traversed to locate zerotree roots.

If the coefficient matrix that indicates the pixel intensities for the original image is a 4×4 matrix, then the matrix 40 may be of the form that is depicted in FIG. 5. In this manner, the LL, LH, HL and HH subband images of the second decomposition level each have one coefficient, represented by "A" (for the LL subband image), "B" (for the LH subband image), "C" (for the HL subband image) and "D" (for the HH subband image), respectively. As depicted in FIG. 5, for the first decomposition level, the coefficients for the LH, HL and HH subband images are represented by the following respective matrices:

$$\begin{bmatrix} E_1 & E_2 \\ E_3 & E_4 \end{bmatrix}, \begin{bmatrix} F_1 & F_2 \\ F_3 & F_4 \end{bmatrix}, \begin{bmatrix} G_1 & G_2 \\ G_3 & G_4 \end{bmatrix}$$

It is noted that each coefficient of the second decomposition level (except A), is associated with at least four coefficients of the first decomposition level, i.e., each coefficient of the first decomposition level has at least four descendant coefficients in the second decomposition level. Therefore, each bit in the first decomposition level has at least four descendent coefficients in the second decomposition level.

For each bit order, the processor 112 may process the bits in the scanning sequence described above. If a particular bit indicates a "1" or a "−1," then the processor 112 generates the P or N code and proceeds to process the next bit in the scanning sequence. However, if a particular bit indicates a "0," then the processor 112 may trace the bit through its descendants to determine if the bit is an isolated zero or a zerotree root. The coefficients in the LL subband are simply entropy encoded.

As an example, to produce the code for the least significant bit (called D(1)) of the D coefficient (located in the HH subband of the second decomposition level), the processor 112 determines whether the D(1) bit indicates a "0." If so, the processor 112 evaluates the descendant bits $G_1(1)$, $G_2(1)$, $G_3(1)$ and $G_4(1)$ of the subband HH of the first decomposition level in search of a "1" or "−1," as indicated in FIG. 6. If one of these bits indicates a "1" or "−1," then the D(1) bit is an isolated zero. Otherwise the D(1) bit is a zerotree root.

As a numeric example, a 4×4 coefficient matrix that indicates pixel intensities for an image may undergo a two level decomposition to form the following matrix:

$$\begin{bmatrix} 4 & 1 & 1 & 2 \\ -2 & 0 & 0 & 1 \\ 0 & 3 & 0 & 0 \\ 0 & 1 & 0 & 0 \end{bmatrix}$$

Because the maximum absolute value is "4," three bits may be used to represent the coefficients, as depicted in the following matrix:

$$\begin{bmatrix} 100 & 001 & 001 & 010 \\ -010 & 000 & 000 & 001 \\ 000 & 011 & 000 & 000 \\ 000 & 001 & 000 & 000 \end{bmatrix}$$

Therefore, the processor 112 begins the encoding by generating codes for the third order bits (i.e., the most significant bits, which may be zero also) of the coefficients. More particularly, to generate the codes for the third order bits, the processor 112 follows the path 28 (see FIG. 5) and produces the appropriate code for the third bit of each coefficient along the path 28. If a particular bit indicates a "0," then the processor 112 evaluates the descendents of the bit to find isolated zeros and zeroroots. The coding of the third order bits by the processor 112 produces the following codes (listed in the order of production): P,R,R,R. Subsequently, the processor 112 produces the codes for the second order bits (listed in order of production): IZ,IZ,N,R,IZ,P,IZ,IZ,IZ, P,IZ,IZ. Lastly, the processor 112 produces the codes for the first order bits (listed in order of production): IZ,P,IZ,R,P, IZ,IZ,P,IZ,P,IZ,P. As described above, the processor 112 may indicate the codes via a two bit coding scheme and transmit the codes as produced via a bit stream.

As an example, another processor 200 (see FIG. 2) may use the bit stream to reconstruct the coefficient matrix that indicates the pixel in intensities of the original image in the following manner. Before the decoding begins, the processor 200 first receives an indication from the processor 112 that three levels of coding (i.e., one level for each bit order) have been used. After obtaining this information, the processor 200 may reconstruct the original coefficient matrix using the codes in the order that the codes are produced. More particularly, the processor 200 may use the codes produced by the coding of the bits of the third bit order (i.e., the first level of coding) to produce the following matrix:

$$\begin{bmatrix} 100 & 000 & 000 & 000 \\ 000 & 000 & 000 & 000 \\ 000 & 000 & 000 & 000 \\ 000 & 000 & 000 & 000 \end{bmatrix}$$

The processor 200 may use this matrix to reconstruct a coarse version (i.e., a lower resolution version) of the original image. However, if a more refined version is desired, the processor 200 may use the codes that are produced by the coding of the second bit order (i.e., the second level of coding) to produce the following matrix:

$$\begin{bmatrix} 100 & 000 & 000 & 000 \\ -010 & 000 & 000 & 000 \\ 000 & 010 & 000 & 000 \\ 000 & 000 & 000 & 000 \end{bmatrix}$$

Finally, if the processor 200 uses the codes that are produced by the coding of the bits of the first order (i.e., the third level of coding), the processor 200 produces the original matrix of decomposed wavelet coefficients.

Figure 7:
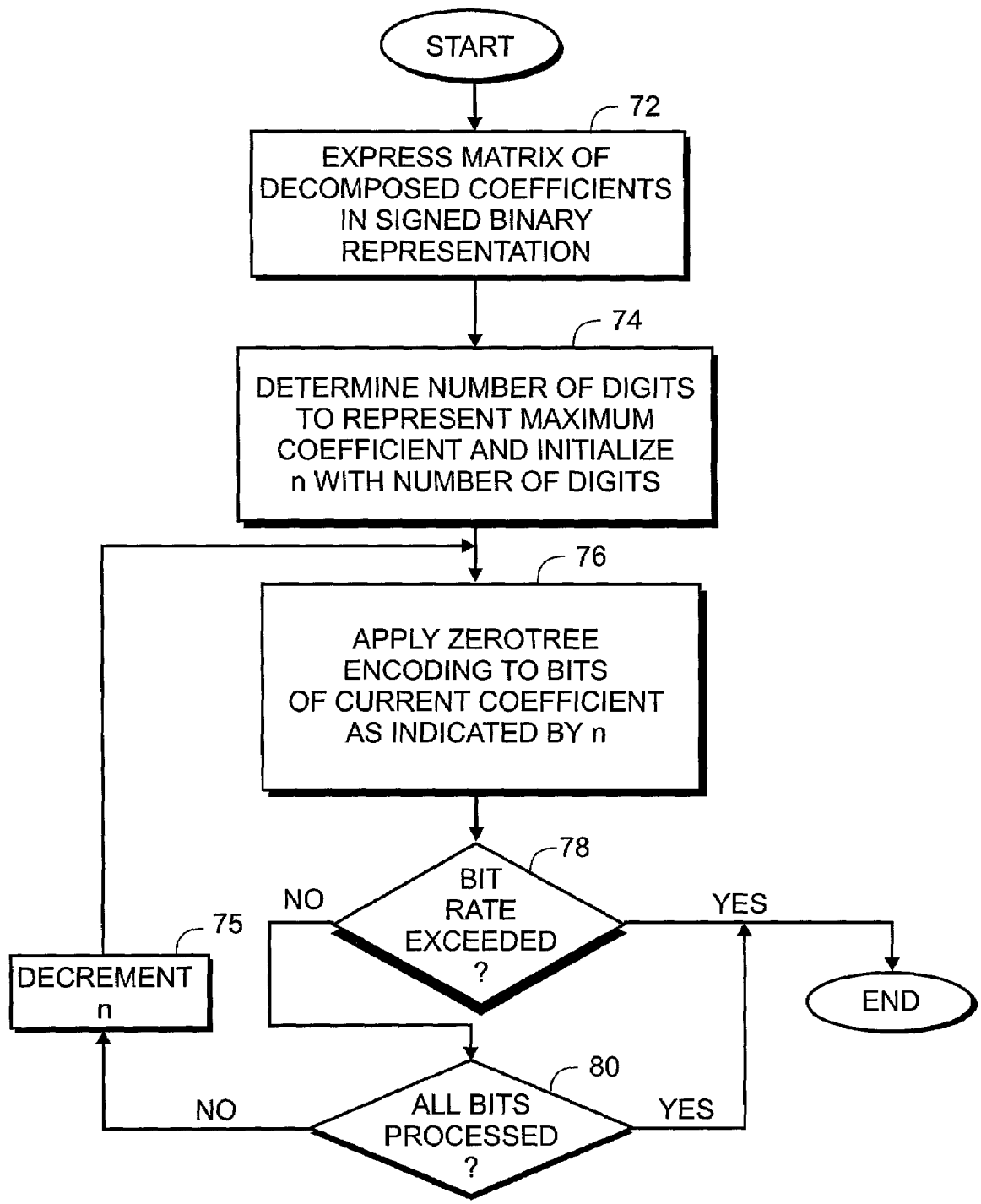
FIG. 7 is a flow chart illustrating the execution of a program to encode wavelet coefficients according to an embodiment of the invention.

Referring to FIG. 7, to summarize, the compression program 119, when executed by the processor 112 may cause the processor 112 to perform the following procedure to produce the above-described coding. First, the processor 112 may express (block 72) a matrix of decomposed coefficients in a signed binary representation. Next, the processor 112 may determine (block 74) the number of digits that are needed to represent the absolute value of the maximum wavelet coefficient. This processor 112 uses a variable (called n) that indicates the current bit order being processed by the processor 112. In this manner, the processor 112 uses a software loop to process the bits, one bit order at a time. To accomplish this, the processor 112 produces codes (block 76) for the bits of the current bit order the using the techniques described above. Subsequently, the processor 112 determines (diamond 78) whether the rate of transmitted bits may exceed a predetermined bit rate. If so, the processor 112 terminates the coding for the current image to comply with the predetermined bit rate. Otherwise, the processor 112 determines (diamond 80) if all bit orders have been processed, i.e., the processor 112 determines if n equals "1." If not, the processor 112 decrements (block 75) the order that is indicated by the n variable by one and proceeds to block 76 to traverse the loop another time to produce codes for the bits of another bit order. Otherwise, the coding is complete.

Referring back to FIG. 2, in some embodiments, the processor 112 may be part of a computer system 100. The computer system 100 may include a bridge, or memory hub 116, and the processor 112 and the memory hub 116 may be coupled to a host bus 114. The memory hub 116 may provide interfaces to couple the host bus 114, a memory bus 129 and an Accelerated Graphics Port (AGP) bus 111 together. The AGP is described in detail in the Accelerated Graphics Port Interface Specification, Revision 1.0, published on Jul. 31, 1996, by Intel Corporation of Santa Clara, Calif. A system memory 118 may be coupled to the memory bus 129 and store the compression program 119. As described above, the compression program 119, when executed by the processor 112, may cause the processor 112 to provide wavelet coefficients that indicate an image and represent each wavelet coefficient as a collection of ordered bits. The processor 112 codes the bits of each order to indicate zerotree roots that are associated with the order.

Among other features of the computer system 100, a display controller 113 (that controls the display 114) may be coupled to the AGP bus 11. A hub communication link 115 may couple the memory hub 116 to another bridge circuit, or input/output (I/O) hub 120. In some embodiments, the I/O hub 120 includes interfaces to an I/O expansion bus 125 and a Peripheral Component Interconnect (PCI) bus 121. The PCI Specification is available from The PCI Special Interest Group, Portland, Oreg. 97214.

A modem 140 may be coupled to the PCI bus 121 to a telephone line 142. In this manner, the modem 140 may provide an interface that permits the bit stream that is produced by the processor 112 to be communicated to the processor 200. The I/O hub 120 may also include interfaces to a hard disk drive 132 and a CD-ROM drive 133, as examples. An I/O controller 117 may be coupled to the I/O expansion bus 125 and receive input data from a keyboard 124 and a mouse 126, as examples. The I/O controller 117 may also control operations of a floppy disk drive 122. Copies of the program 119 may be stored on, as examples, the hard disk drive 132, a diskette or a CD-ROM, as just a few examples.

In the context of this application, the phrase "computer system" may generally refer to a processor-based system and may include (but is not limited to) a graphics system, a desktop computer or a mobile computer (a laptop computer, for example), as just a few examples. The term "processor" may refer to, as examples, at least one microcontroller, X86 microprocessor, Advanced RISC Machine (ARM) microprocessor, or Pentium-based microprocessor. The examples given above are not intended to be limiting, but rather, other types of computer systems and other types of processors may be included in embodiments of the invention.

Other embodiments are within the scope of the following claims. For example, the matrices of decomposed coefficients described above have one coefficient in each subband of the highest decomposition level. However, this arrangement is for purposes of simplifying the discussion of the coding. Therefore, each subband of the highest decomposition level may have multiple coefficients, and the above-described techniques may be applied to code the bits associated with these coefficients. In some embodiments, the processor 112 may code all of the bits of each order in parallel. In this manner, the coding of the bits of each bit order may be performed by the processor's execution of a separate thread. Other arrangements are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   providing wavelet coefficients that indicate an image, the bits of each wavelet coefficient being associated with a different bit order so that each bit order is associated with one of the bits of each wavelet coefficient;
   expressing the wavelet coefficients in signed binary representation;
   determining whether a rate of coded bits exceed a predetermined bit rate; and
   generating the coded bits to indicate zerotree roots that are associated with the bit orders and regulating the generation based on whether the rate exceeds the predetermined bit rate.

2. The method of claim 1, wherein each bit order is associated with only one of the bits of each wavelet coefficient.

3. The method of claim 1, wherein the act of coding the bits comprises:
   determining which of the bits indicate zeros; and
   classifying each zero as either an isolated zero or a zerotree root.

4. The method of claim 3, wherein some of the wavelet coefficients are descendants of some of the other wavelet coefficients, and wherein the act of determining comprises:
   traversing a descendant tree from a bit associated with one of said some of the wavelet coefficients to bits associated with said other wavelet coefficients to locate the zerotree roots.

5. The method of claim 1, wherein the act of providing comprises:
   producing different levels of the code, each level being associated with a different resolution of the image.

6. The method of claim 5, wherein the levels that are associated with lower resolution are associated with higher orders.

7. The method of claim 1, wherein the act of providing wavelet coefficients comprises:
   providing intensity level coefficients that indicate pixel intensities of the image; and
   transforming the intensity level coefficients into wavelet subbands.

8. An article comprising a storage medium readable by a processor-based system, the storage medium storing instructions to cause a processor to:
   provide wavelet coefficients that indicate an image, the bits of each wavelet coefficient being associated with a different bit order so that each bit order is associated with one of the bits of each wavelet coefficient;
   express the wavelet coefficients in signed binary representation;

determine whether a rate of coded bits exceed a predetermined bit rate; and generate the coded bits to indicate zerotree roots that are associated with the bit orders and regulating the generation based on whether the rate exceeds the predetermined bit rate.

9. The article of claim 8, wherein each bit order associated with only one of the bits of each wavelet coefficient.

10. The article of claim 8, the storage medium comprising instructions to cause the processor to:

determine which of the bits indicate zeros, and classify each zero as either an isolated zero or a zerotree root.

11. The article of claim 10, wherein some of the wavelet coefficients are descendants of some of the other wavelet coefficients, the storage medium comprising instruction to cause the processor to:

traverse a descendant tree from a bit associated with one of said some of the wavelet coefficients to bits associated with said other wavelet coefficients to locate the zerotree roots.

12. The article of claim 8, the storage medium comprising instructions to cause the processor to:

produce different levels of the code, each level being associated with a different resolution of the image.

13. The article of claim 12, wherein the levels that are associated with lower resolutions are associated with higher orders.

14. A computer system comprising:

a processor; and a memory storing a program to cause the processor to:

provide wavelet coefficients that indicate an image, the bits of each wavelet coefficient being associated with a different bit order so that each bit order is associated with one of the bits of each wavelet coefficient;

express the wavelet coefficients in signed binary representation;

determine whether a rate of coded bits exceed a predetermined bit rate; and generate the coded bits to indicate zerotree roots that are associated with the bit orders and regulating the generation based on whether the rate exceeds the predetermined bit rate.

15. The computer system of claim 14, wherein each bit order is associated with only one of the bits of each wavelet coefficient.

16. The computer system of claim 14, wherein the program causes the processor to code the bits by determining which of the bits indicate zeros and classifying each zero as either an isolated zero or a zerotree root.

17. The computer system of claim 16, wherein some of the wavelet coefficients are descendants of some of the other wavelet coefficients, and wherein the processor determines which of the bits are zeros by traversing a descendant tree from a bit associated with one of said some of the wavelet coefficients to bits associated with said other wavelet coefficients to locate the zerotree root.

18. The computer system of claim 14, wherein the program causes the processor to provide the wavelet coefficients by producing different levels of the code, each level being associated with a different resolution of the image.

* * * * *